United States Patent [19]

Salter et al.

[11] Patent Number: 4,844,663
[45] Date of Patent: Jul. 4, 1989

[54] FEED LINE-ULTRASONIC ACTIVATED GAS INJECTION

[75] Inventors: James A. Salter, Katy; Thomas S. DeWitz, Houston, both of Tex.; Hendricus A. Dirkse; Johannnes W. Van Der Meer, both of Amsterdam, Netherlands

[73] Assignee: Shell Oil Company, Houston, Tex.

[21] Appl. No.: 98,590

[22] Filed: Sep. 18, 1987

[51] Int. Cl.$^4$ .............................................. B65G 53/66
[52] U.S. Cl. ...................................... 406/19; 406/85; 406/12; 406/197; 48/86 R
[58] Field of Search ................... 406/10, 12, 14, 15, 406/19, 23, 24, 25, 28, 29, 50, 85, 93, 94, 109, 134, 136–138, 146, 197, 198; 48/86 R, DIG. 10, 202, 203, 210; 222/195, 196

[56] References Cited

U.S. PATENT DOCUMENTS

| | | | |
|---|---|---|---|
| 3,758,162 | 9/1973 | Holm et al. | 406/85 |
| 4,017,269 | 4/1977 | Dutz et al. | 48/86 R |
| 4,049,394 | 9/1977 | Gernhardt et al. | 406/12 X |
| 4,171,852 | 10/1979 | Haentjens | 406/85 |
| 4,570,552 | 2/1986 | Rachner et al. | 406/197 X |

Primary Examiner—Sherman D. Basinger
Assistant Examiner—Paul E. Salmon

[57] ABSTRACT

The present invention is directed to an apparatus and method for minimizing mass flow rate fluctuations of a particulate solid fuel and gas mixture having a coal mass flow rate ranging from about 50–800 kg/m$^3$ and a corresponding frequency range of about 0.1 to 100 Hertz transported to a reactor.

37 Claims, 2 Drawing Sheets

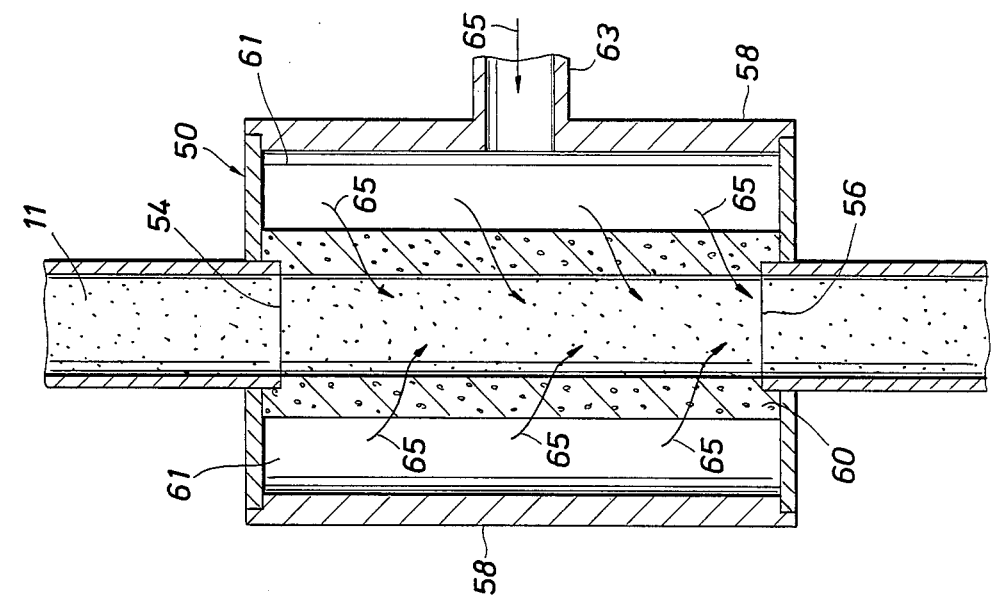
FIG. 3
FIG. 2A  COAL FEED SUSPENSION DENSITY BEFORE ULTRASONIC GAS INJECTION
FIG. 2B  COAL FEED SUSPENSION DENSITY AFTER ULTRASONIC GAS INJECTION

FEED LINE-ULTRASONIC ACTIVATED GAS INJECTION

RELATED APPLICATIONS

This invention is related to Assignee's patent applications corresponding to Ser. Nos. 098,152, 098,588, 098,589, and 098,161 filed on Sept. 18, 1987.

BACKGROUND OF THE INVENTION

Conventional coal feed systems using gravity flow of solids, such as coal feed to coal-fired boilers, can allow major fluctuations in the coal mass flow rate and suspension density.

However, fluctuations of coal mass flow rate to burners within a coal gasification reactor, hereinafter referred to as gasifier, are detrimental to gasifier performance. For example, fluctuations of the coal mass flow rate cause inefficient combustion of fuel within the gasifier and damaging heat fluxes to the burner face within a reaction zone near the burner which result in thermal stresses on the burner face. Since the residence time of the coal within the reaction zone of the reactor is approximately 400 milliseconds or less, the coal mass flow rate should preferably be constant over periods of this order and preferably over shorter periods to maintain constant local conditions. The residence time in the reaction zone determines the upper limit of the range of interest of coal density fluctuations. The response time of a typical process control valve is 10 sec. which determines the lower end of the frequency of interest. Therefore, we are interested in coal flow fluctuations of 0.1–100 Hertz and coal suspension densities of about 50–800 kg/m$^3$, preferably 200–500 kg/m$^3$ as is used in the present invention.

Measurement and automatic control of coal mass flow rate to the burners of a gasifier by conventional means are too slow to ensure a constant coal mass flow rate to the burner of a gasifier over time periods as short as 0.4 seconds or less.

The present invention is directed to overcoming this problem in the prior art.

Applicants are not aware of any prior art which, in their judgment as persons skilled in this particular art, would anticipate or render obvious the present invention. However, for the purpose of fully developing the background of the invention, and establishing the state of requisite art, the following art is set forth: U.S. Pat. Nos. 2,779,510; 3,682,511; 4,159,150 and 4,412,762.

SUMMARY OF THE INVENTION

The primary purpose of the present invention relates to minimizing mass flow rate fluctuations of a reactive or catalyst solid and gas mixture delivered to a reactor. In particular, this invention relates to minimizing mass flow rate fluctuations of a particulate solid coal and gas mixture having a coal suspension density ranging from about 50–800 kg/m$^3$, preferably 200–500 kg/m$^3$, delivered to a gasifier where the residence time of the fuel within the primary reaction zone is approximately 0.4 seconds and the mixture suspension density fluctuates at frequencies ranging from about 0.1 to 100 Hertz.

Preferably, such an apparatus for minimizing mass flow rate fluctuations of a reactive or catalytic solids and gas mixture includes: means for receiving the mixture, means for controlling a discharge flow rate of the mixture exiting the means for receiving the mixture, means for maintaining a differential pressure between the means for receiving the mixture and the reactor, and means for selectively controlling the mass flow rate of the mixture being transported from the means for receiving the mixture to the reactor including means for injecting a gas at a selected amplitude and ultrasonic frequency into a lower end of the means for receiving the mixture to form an aerated portion.

Preferably, a method for minimizing mass flow rate fluctuations includes: introducing the mixture into a means for receiving the mixture, controlling a discharge flow rate of the mixture exiting the means for receiving the mixture at a lower end thereof, maintaining a differential pressure between the means for receiving the mixture and the reactor, pneumatically transporting the mixture by conduit from the means for receiving the mixture to the reactor, and controlling the mass flow rate of the mixture being transported from the means for receiving the mixture to the reactor including injecting a gas at a selected amplitude and frequency into a lower end of the means for receiving said mixture.

The various features of novelty which characterize the invention are pointed out with particularity in the claims forming a part of this disclosure. For a better understanding of this invention, its operating advantages and specific object obtained by its uses, reference may be made to the accompanying drawings and descriptive matter in which there are illustrated preferred embodiments of the invention.

BRIEF DESCRIPTION OF THE DRAWINGS

FIGS. 2A and 2B are graphs illustrating the effect of injecting a gas at a selected amplitude and ultrasonic frequency.

FIG. 3 is a cut-away view of element 50 shown in FIG. 1.

DESCRIPTION OF A PREFERRED EMBODIMENT

Figure 1:
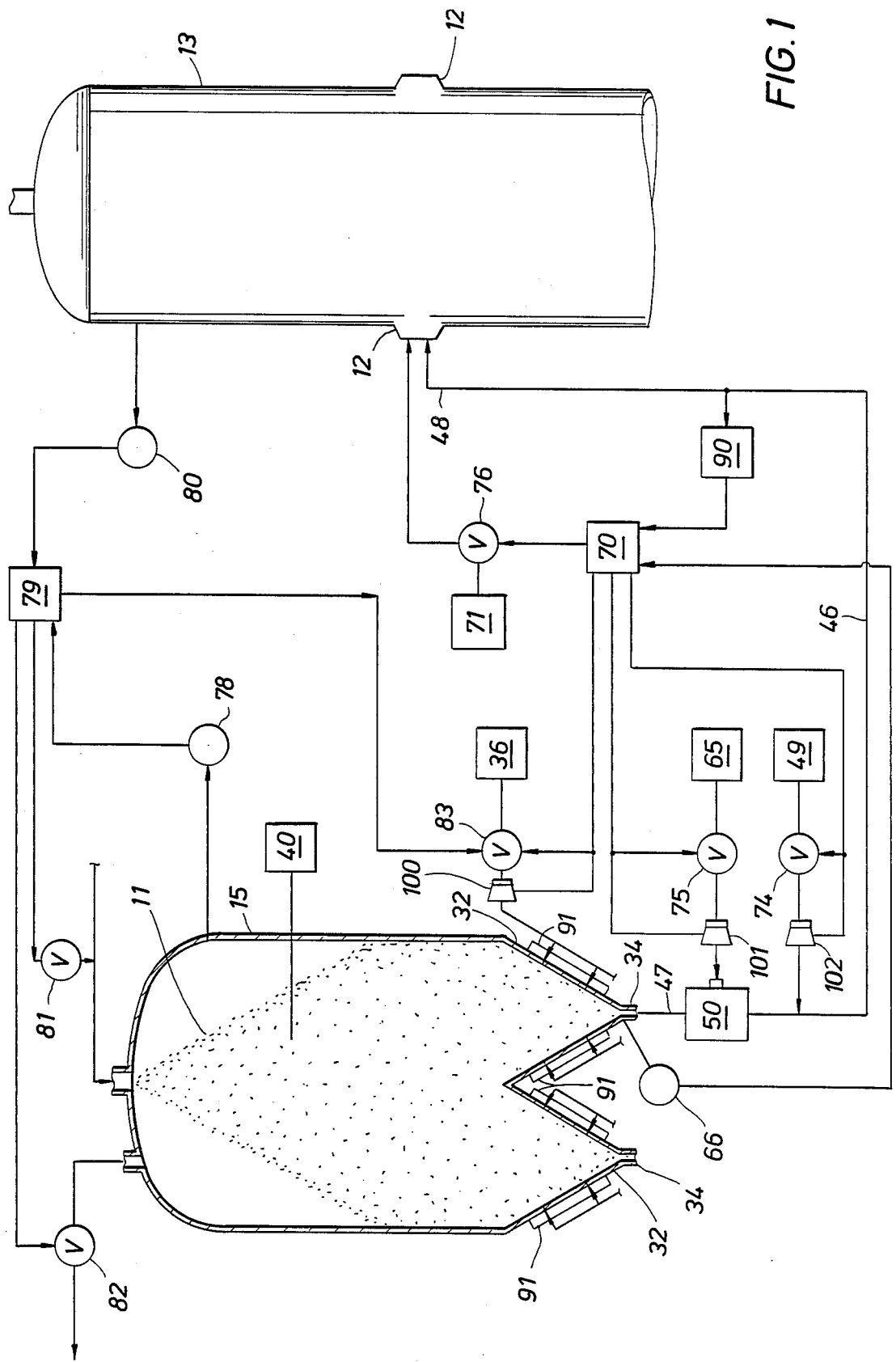
FIG. 1 illustrates a preferred embodiment of the present invention.

Generation of synthesis gas occurs by partially combusting organic or carbonaceous fuel, such as coal, at relatively high temperatures in the range of 800° to 2000° C. and at a pressure range of from about 1 to 200 bar in the presence of oxygen or oxygen-containing gases in a gasifier. Oxygen-containing gases include air, oxygen enriched air, and oxygen optionally diluted with steam, carbon dioxide and/or nitrogen.

In the present invention, the fuel and gas mixture is discharged from a feed vessel apparatus, preferably having multiple outlets, each outlet being in communication with at least one burner associated with the gasifier. Typically, a gasifier will have burners in diametrically opposing positions. Generally, the burners have their discharge ends positioned to introduce the agents of combustion into the resulting gasifier flame.

Of particular importance in the manufacture of synthesis gas is the uniform manner in which the particulate fuel is introduced to the burners within the gasifier so as to minimize fluctuations in the mass flow rate of the fuel being supplied to the burners. If the mass flow rate of the particulate fuel fluctuates, zones of underheating are generated next to zones of overheating in the gasifier. As a result, in the zones of underheating the fuel is not completely gasified and in zones of overheating the fuel is completely converted into less valuable products, viz. carbon dioxide and water vapor. Additionally, local high temperatures in the gasifier could damage the refractory lining which is normally arranged at the inner surface of the gasifier wall.

Various factors substantially affect the mass flow rate of the fuel being supplied to the burners. In particular, the discharging of the fuel from a feed vessel and the pneumatic transporting by conduit of the fuel from the feed vessel to the gasifier affect the mass flow rate of fuel. Specifically, fuel and gas mixtures having densities ranging from about 50-800 kg/m$^3$ transported through a conduit having a diameter less than 150 mm experience significant pressure drop due to the summation of various contributions such as frictional losses, restrictions, curvatures, etc. within the conduit.

Measurement and automatic control of coal mass flow rate to the burners of a gasifier by conventional means are too slow to ensure a constant coal mass flow rate to the burner of a gasifier over time periods as short as 0.4 seconds or less.

The present invention preferably utilizes local suspension mass flow rate measurements of the mixture from the feed vessel and/or transport conduit to the gasifier that are derived from density-indicating means which provide an output available as a continuous analogue signal. Comparison of the output allows the determination of fluctuations of coal mass flow rate to the burners of the gasifier.

If the fluctuations of coal flow are envisaged as the alternate passage of a spectrum of dense and less dense slugs or plugs of coal powder past a measuring device, this phenomenon can be described in terms of plug length, frequency of passage, and amplitude. A suspension density signal from this device is a measure of the plug length, frequency of passage, and amplitude of the dense or less dense phase passing the measuring device. The plug length, frequency of passage, and amplitude indicate measures of the magnitude of variations and the distance or time over which variations in mass flow rate persisted.

The present invention is concerned with the spectrum of coal mass flow rates which fluctuate in the frequency range of 0.1 to 100 Hertz. These fluctuations tend to occur naturally due to the solids flow properties of the particulate material. Other factors affecting the frequency response of the operations include hardware such as valves, operating pressures, the flow regime in the transport lines, and the velocity of the suspension in the transport line. Since fluctuations within this frequency range are detrimental to the gasifier's performance and service life as previously described, minimizing these fluctuations is the principal object of this invention.

An advantage of the present invention is a steady uniform mass flow rate of the coal and gas mixture to each burner of the gasifier within the above-stated frequency range.

Another advantage of the present invention is the imparting of energy to the mixture for transport to the burners of the gasifier.

A further advantage of the present invention is the capability of maintaining high suspension densities, e.g. greater than 200 kg/m$^3$, in the transport line from the feed vessel to the gasifier and thereby reduce the consumption of aeration and pneumatic transport gas.

An additional advantage of the present invention is that the feed hopper discharge is buffered from back pressure fluctuations in the transport line between the feed vessel and the gasifier.

Although the invention is described hereinafter primarily with reference to particulate coal, the method and apparatus according to the invention are also suitable for catalysts and other finely divided reactive solids fuels which could be partially combusted, such as lignite, anthracite, bituminous, brown coal, soot, petroleum coke, and the like. Preferably, the size of solid carbonaceous fuel is such that 90 percent by weight of the fuel has a particle size smaller than 100 mesh (A.S.T.M.)

Having thus generally described the apparatus and method of the present invention, as well as its numerous advantages over the art, the following is a more detailed description thereof, given in accordance with specific reference to the drawings. However, the drawings are of the process flow type in which auxiliary equipment, such as pumps, compressors, cleaning devices, etc. are not shown. All values are merely exemplary or calculated.

Referring to FIG. 1 of the drawing, an apparatus for minimizing mass flow rate fluctuations of a combustible, particulate solids and gas mixture 11 in the frequency of about 0.1 to 100 Hertz transported to at least one burner 12 of a gasifier 13 generally comprises means for receiving the mixture 11 shown for illustrative purposes as a multiple outlet feed vessel 15 having downwardly-converging walls 32 and openings 34 at a lower end thereof for discharging the mixture 11 therefrom. Preferably, the lower end of the feed vessel 15 is cone-shaped having an included angle less than 90 degrees.

Means for controlling a discharge flow rate of the mixture 11 exiting the feed vessel 15 preferably includes aerating the feed vessel 15 at the lower end thereof to form an aerated portion by injecting gas 36, such as nitrogen, carbon dioxide, or synthesis gas, as shown in FIG. 1.

Additionally, the aeration can be compartmentalized as disclosed in Assignee's patent application Ser. No. 098,161 mentioned above which disclosure is incorporated herein by reference. Aerating the lower end of the feed vessel 15 allows for smaller discharge openings 34 and a transport conduit 46 having a smaller diameter.

The structure of the feed vessel 15, as shown in FIG. 1 and described above, in conjunction with aerating the mixture 11 immediately above the lower end of the feed vessel 15, permit transport of coal and gas mixtures 11 at much higher suspension densities, e.g. greater than 200 kg/m$^3$, than are attainable with systems which fluidize the coal and gas mixtures throughout the feed vessel. This is significant in coal and gas mixtures used in the gasification process because the aeration gas is frequently inert and would act as a diluent in the product gas thereby reducing the heating value per standard cubic foot.

Alternatively, means for controlling a discharge flow rate of the mixture 11 can take the form of means for mechanically vibrating the mixture such as by using a hammering device, an acoustic horn, or in any other manner well known to the art.

Conventional means for controlling the discharge flow rate, such as valves, are not preferred since they introduce obstructions in the transport of the coal and hence, contribute to fluctuations in the mass flow rate of the coal to the burners of the gasifier.

The apparatus of the present invention preferably includes means for maintaining a level of solids 40 in the feed vessel 15 of a height corresponding to at least about 50 percent of the solids volume above the discharge openings which can take the form of radiation densitometers, ultrasound, or mechanical detectors or in any other manner well known to the art.

Maintaining the level at at least about 50 percent lessens the effect of the level and sluicing on the flow out of the feed vessel 15 which would influence the coal flow to the burner.

A minimum differential pressure between the feed vessel 15 and the gasifier 13 of at least about 2 to 10 bar is maintained to prevent flash back or ingress of synthesis gas into the feed vessel 15 and to maintain coal solids flow to the burners 12 of the gasifier 13. As an alternative to maintaining a differential pressure using conventional means, such as a valve located between the feed vessel 15 and the gasifier 13, the present invention employs means for determining the pressure of the feed vessel 15, such as a pressure transducer 78 in communication with a differential pressure controller 79; means for determining the pressure of the gasifier 13, such as a pressure transducer 80 in communication with controller 79; means for comparing the determined pressures via the controller 79; and means for adjusting the pressure within the feed vessel 15 such as by regulating valves 81, 82, 83 to increase or decrease the pressure within the vessel 15.

Maintaining a differential pressure between the feed vessel 15 and the gasifier 13 is in part achieved by injecting gas into a pressurized gas cap area in the upper portion of the feed vessel 15. The pressure in the vessel 15 is controlled by a separate controller 79 which adds pressurized gas via valve 81 or relieves gas via valve 82 at a rate of at least about 0.1 bar/min to ensure adequate control of the pressure within the feed vessel 15.

Local aeration, such as aeration pads 91, in the portion immediately above the discharge openings 34 of the feed vessel 15 prevents the coal solids in the mixture 11 from bridging or becoming packed within the feed vessel 15 due to the differential pressure being maintained between the feed vessel 15 and the gasifier 13. The packing of solids in the lower portion of the feed vessel 15 would result in unsteady or no coal flow from the feed vessel 15.

It is preferable that separate gas supplies for injecting gas and maintaining a differential pressure between the feed vessel 5 and the gasifier 13 be provided, as illustrated in FIG. 1, so that a change in pressure or flow of one supply does not influence the other.

Means for pneumatically transporting the mixture 11 from the feed vessel 15 to the gasifier 13 is shown in FIG. 1 for illustrative purposes as including a conduit 46 having entry and exit portions 47, 48. The entry portion 47 is in fluid communication with the lower end of the feed vessel 15 and the exit portion 48 is in fluid communication with the burner 12 of the gasifier 13. Means for injecting a gas 49, such as nitrogen, carbon dioxide, or syngas, under pressure into the mixture 11 at at least one point in a conduit 46 is accomplished in a manner well known to the art. Means for injecting the gas 49 at a selected amplitude and ultrasonic frequency can be accomplished using a variable frequency horn, shown in FIG. 1 as 102, or in any other manner well known to the art. The first gas 49 can also be injected at a selected amplitude and ultrasonic frequency along other points (not shown) of the conduit 46 to disperse slugs or plugs of the coal and gas mixture in the conduit 46. Selection of the preferred location(s) for injecting the first gas 49 are based on the increasing amplitude of the slugs.

It would not be preferable to inject the first gas at a location too close to the discharge opening 34 of the feed vessel 15 because injected gas would increase the back pressure at the feed vessel 15 discharge which would result in a nonuniform discharge of the coal and gas mixture from the vessel 15.

The conduit 46 is made as smooth as possible, i.e. no protrusions into the flowing mixture 11 and minimal recesses and bends. Any bends or curvatures of the conduit 46 preferably have radii of curvature equal to four feet or ten conduit 46 diameters, whichever is larger, so that the coal remains in suspension within the conduit 46.

Preferably, the diameter of the conduit is in the range of 4 mm to 150 mm, preferably 6–50 mm. A diameter within this specified range is desirable to achieve high velocities within the conduit, say 15 m/sec for suspension densities of 100–500 kg/m$^3$. High velocities promote a uniformly mixed coal solids and gas mixture introduced to the burners of the gasifier. Conduits having a diameter larger than 150 mm could not provide the degree of mixing required to provide a uniformly dispersed coal solids and gas mixture to the burners of the gasifier; whereas, conduits smaller than 4 mm tend to cause the coal particles to bridge within the conduit 46.

The suspension density of the coal and gas mixture 11 varies depending upon the type of coal being used. For example, the solids suspension density of Illinois No. 5 coal normally ranges from 225 to 425 kg/m$^3$, with 350 kg/m$^3$ being the preferred suspension density. Under extreme conditions the suspension density can vary from 50–800 kg/m$^3$.

Means for selectively controlling the density of the mixture 11 being transported from the feed vessel 15 to the gasifier 13 is shown in FIG. 1 for illustrative purposes as including means for determining (directly or indirectly) the suspension density of the mixture at or near the discharge of the feed vessel 15, such as a pressure transducer 66, capacitance densitometer 90, ultrasound meter, gamma ray densitometer, or opacity to an electromagnetic radiator; means for comparing the determined suspension density with a preselected suspension density, such as controller 70; and means for adjusting the density, amplitude, and frequency of the mixture 11.

Signals are transmitted from the controller 70 to means for adjusting the flow rate, such as valve 83, and means for adjusting the amplitude and ultrasonic frequency, such as a horn 100, of the gas 36 injected into the lower end of the means for receiving said mixture 15. The graph shown in FIG. 2A illustrates the coal mass flow rate fluctuations relative to the continuous density signal analogue as indicated from pressure transducer 66 when the coal exits the feed vessel 15. FIG. 2B illustrates the effect of injecting the aeration gas 36 at a selected amplitude and ultrasonic frequency so as to minimize the fluctuations over time. The frequency of the gas 36 is normally in the range greater than 100 Hertz. Ultimately, the pulses should be 180 degrees out of phase with the frequency of the solids and gas mixture 11 so as to reduce the amplitude and frequency and thereby minimize the mass flow rate fluctuations of mixture 11 to the gasifier.

Likewise, signals are transmitted from the controller 70 to means for adjusting the flow rate, such as valve 74, and means for adjusting the amplitude and ultrasonic frequency, such as a horn 102, of gas 49 injected into the conduit 46. Additionally, signals are transmitted from the controller 70 to means for adjusting the flow rate, such as valve 75, and means for adjusting the amplitude and ultrasonic frequency, such as a horn 101, of gas 65 injected into the cylinder 50. Preferably, the means for controlling the amplitude and ultrasonic frequency gases 36, 65, and 49 are independently controllable.

The right circular cylinder 50 shown in FIG. 1 is in fluid communication with the discharge opening 34 of the feed vessel 15. FIG. 3 is a cross-sectional view of the cylinder 50 shown in FIG. 1. The cylinder 50 has entry and exit ports 54, 56, for passing the mixture 11 therethrough. The cylinder 50 has substantially concentric outer and inner walls 58, 60, forming an annulus 61. The outer wall 58 has at least one inlet port 63 for injecting a second gas 65 such as nitrogen, carbon dioxide, or syngas, into the annulus 61. The inner wall 60, which can be made of a porous or perforated material, is in contact with the mixture 11. The second gas 65 permeates from the enclosed annulus space 61 through the porous or perforated material and into the mixture 11. The present invention includes means for injecting gas 65 preferably in a pulse-like manner, at a selected amplitude and ultrasonic frequency, such as by a horn 101, into the annulus and through the porous inner wall of the cylinder 50 being in contact with the mixture.

As previously mentioned, the atmosphere of the gasifier should be a reducing environment. Means for selectively controlling the weight ratio of oxygen to mixture introduced to the gasifier 13 is desirable. Preferably, the ratio is maintained so that the ratio of oxygen to moisture and ash free coal is in the range of 0.6 to 1.2, more preferably 0.8 to 0.9. Controlling the ratio can be accomplished in various ways such as transmitting a signal from the controller 70 to a means for selectively controlling the rate of oxygen-containing gas 71 introduced into the gasifier 13, such as valve 76. If the determined mass flow rate of the coal solids and gas mixture 11 flowing to the burners 12 as measured by the densitometer 90 is below the preselected mass flow rate as compared with a preselected mass flow rate by the mass flow rate-controller 70, then the mass flow rate of oxygen-containing gas 71 would be decreased and/or the injection rate of the first or second gas 49, 65, respectively, decreased.

The foregoing description of the invention is merely intended to be explanatory thereof, and various changes in the details of the described method and apparatus may be made within the scope of the appended claims without departing from the spirit of the invention.

What is claimed is:

1. An apparatus for minimizing mass flow rate fluctuations of a particulate solids and gas mixture in the frequency range of about 0.1 to 100 Hertz transported to at least one means for injecting said mixture into a reactor, said apparatus comprising:
   means for receiving said mixture;
   means for controlling a discharge flow rate of said mixture exiting said means for receiving said mixture:
   means for pneumatically transporting said mixture from said means for receiving said mixture to said reactor:
   means for maintaining a differential pressure between said means for receiving said mixture and said reactor; and
   means for selectively controlling the mass flow rate of said mixture being transported from said means for receiving said mixture to said reactor including means for injecting a gas at a selected amplitude and ultrasonic frequency into a lower end of said means for receiving said mixture to form an aerated portion.

2. The apparatus of claim 1 wherein said means for controlling said discharge flow rate of said mixture includes downwardly-converging walls and an opening at a lower end thereof for discharging said mixture therefrom.

3. The apparatus of claim 1 including means for maintaining a level of solids in said means for receiving said mixture of a height corresponding to at least about 50 percent of the maximum solids volume above said opening for discharging said mixture.

4. The apparatus of claim 1 wherein said means for maintaining differential pressure includes means for adjusting the pressure at a rate of at least about 0.1 bar/min 5. The apparatus of claim 1 wherein said means for pneumatically transporting said mixture includes a conduit having entry and exit portions, said entry portion being in fluid communication with the lower end of said means for receiving said mixture and said exit portion being in fluid communication with said means for injecting said mixture into said reactor.

6. The apparatus of claim 5 wherein said means for pneumatically transporting said mixture includes means for injecting a first gas at a selected amplitude and ultrasonic frequency into said mixture at at least one point in said conduit.

7. The apparatus of claim 1 wherein said means for controlling the mixture mass flow rate includes a right circular hollow cylinder in fluid communication with the discharge opening of said means for receiving said mixture, said cylinder having entry and exit ports for passing said mixture therethrough, said cylinder having substantially concentric outer and inner walls forming an annulus, said inner wall being in contact with said mixture and made of porous material, said outer wall having an inlet port, and means for injecting a second gas at a selected amplitude and ultrasonic frequency through said inlet port and into said annulus to allow said second gas to permeate from said annulus through said porous material and into said mixture.

8. The apparatus of claim 2 wherein the lower end of said means for receiving said mixture is cone-shaped having an included angle less than about 90 degrees.

9. The apparatus of claim 5 wherein the diameter of said conduit is in a range of about 4 to 150 mm.

10. The apparatus of claim 5 wherein any bends or curvatures of said conduit have a radii of curvature of at least about 4 feet.

11. The apparatus of claim 1 wherein said aerated portion is compartmented.

12. The apparatus of claim 5 wherein any curvatures of said conduit have radii of curvature of at least about 10 pipe diameters of said conduit.

13. The apparatus of claim 1 wherein said means for controlling said discharge rate of said mixture includes means for mechanically vibrating said mixture near its exit point from said means for receiving said mixture.

14. The apparatus of claim 1 wherein said means for controlling the mixture mass flow rate includes means for determining the mass flow rate of said mixture, means for comparing the determined mass flow rate with a preselected mass flow rate, and means for adjusting the mass flow rate, amplitude, and ultrasonic frequency of the mixture.

15. The apparatus of claim 6 including means for adjusting the amplitude and ultrasonic frequency of said first gas.

16. The apparatus of claim 7 including means for adjusting the amplitude and ultrasonic frequency of said second gas.

17. The apparatus of claim 1 including means for selectively controlling the ratio of oxygen to said mixture introduced to said reactor.

18. The apparatus of claim 17 wherein said means for selectively controlling the ratio of oxygen to mixture includes means for determining the mass flow rate of said mixture, means for comparing the determined mass flow rate with a preselected mass flow rate, and means for adjusting the flow rate of oxygen introduced into said reactor.

19. The apparatus of claim 1 wherein said means for maintaining differential pressure includes means for determining the pressure of said means for receiving said mixture, means for determining the pressure of said reactor, means for comparing the determined pressures, and means for adjusting the pressure of said means for receiving said mixture.

20. The apparatus of claim 19 wherein said means for adjusting pressure includes means for venting pressure from said means for receiving said mixture.

21. The apparatus of claim 19 wherein said means for adjusting pressure includes means for adjusting the aeration rate of said aeration portion of said means for receiving said mixture.

22. A method for minimizing mass flow rate fluctuations of a particulate solids and gas mixture in the frequency range of about 0.1 to 100 Hertz transported to a gasifier, said method comprising:
   introducing said mixture into a means for receiving said mixture;
   controlling a discharge flow rate of said mixture exiting said means for receiving said mixture at a lower end thereof;
   maintaining a differential pressure between said means for receiving said mixture and said reactor;
   pneumatically transporting said mixture by conduit from said means for receiving said mixture to said reactor; and
   controlling the mass flow rate of said mixture being transported from said means for receiving said mixture to said reactor including injecting a gas at a selected amplitude and ultrasonic frequency into a lower end of said means for receiving said mixture.

23. The method of claim 22 including maintaining a level of solids in said means for receiving said mixture of a height corresponding to at least about 50 percent of the maximum solids/gas volume above said opening for discharging said mixture.

24. The method of claim 22 wherein controlling said discharge flow rate of said mixture includes mechanically vibrating said mixture at the lower end of said means for receiving said mixture.

25. The method of claim 22 wherein maintaining differential pressure includes adjusting the pressure at a rate of at least about 0.1 bar/min.

26. The method of claim 22 wherein pneumatically transporting said mixture includes injecting a gas at a selected amplitude and ultrasonic frequency into said mixture at at least one point after exiting said means for receiving said mixture and before entering said means for injecting said mixture into said reactor.

27. The method of claim 22 wherein maintaining a differential pressure includes maintaining the differential pressure at a minimum of about 2 bar.

28. The method of claim 22 wherein controlling the mixture mass flow rate includes determining the mass flow rate of said mixture, comparing the determined mass flow rate with a preselected mass flow rate, and adjusting the mass flow rate, amplitude, and ultrasonic frequency of the mixture.

29. The method of claim 22 including adjusting the amplitude and ultrasonic frequency of said gas.

30. The method of claim 26 including adjusting the amplitude and ultrasonic frequency of said gas.

31. The method of claim 22 including selectively controlling the ratio of oxygen to said mixture introduced to said gasifier.

32. The method of claim 31 wherein selectively controlling the ratio of oxygen to mixture includes determining the mass flow rate of said mixture, comparing the determined mass flow rate with a preselected mass flow rate, and adjusting the flow rate of oxygen introduced into said reactor.

33. The method of claim 22 wherein maintaining differential pressure includes determining the pressure of said means for receiving said mixture, determining the pressure of said reactor, comparing the determined pressures, and adjusting the pressure of said means for receiving said mixture.

34. The method of claim 33 wherein adjusting pressure includes venting pressure from said means for receiving said mixture.

35. The method of claim 33 wherein adjusting pressure includes adjusting the aeration rate of said aeration portion of said means for receiving said mixture.

36. The apparatus of claim 1 including means for adjusting the amplitude and ultrasonic frequency of said gas.

37. The apparatus of claim 19 wherein said means for adjusting pressure includes means for adding pressure from said means for receiving said mixture.

* * * * *